INVENTOR.
BERRY W. FOSTER

Nov. 3, 1964 B. W. FOSTER 3,155,309
DEVICE FOR PRODUCING A PERIODIC LINEAR DISPLACEMENT
OVER A SMALL PORTION OF ITS CYCLE
Filed March 13, 1961 3 Sheets-Sheet 2

INVENTOR.
BERRY W. FOSTER
BY
ATTY.

Nov. 3, 1964  B. W. FOSTER  3,155,309
DEVICE FOR PRODUCING A PERIODIC LINEAR DISPLACEMENT
OVER A SMALL PORTION OF ITS CYCLE
Filed March 13, 1961  3 Sheets-Sheet 3

FIG. 6.

INVENTOR.
BERRY W. FOSTER
BY
ATTORNEYS

United States Patent Office 3,155,309
Patented Nov. 3, 1964

3,155,309
DEVICE FOR PRODUCING A PERIODIC LINEAR DISPLACEMENT OVER A SMALL PORTION OF ITS CYCLE
Berry W. Foster, 1147 10th St., Santa Monica, Calif.
Filed Mar. 13, 1961, Ser. No. 95,212
14 Claims. (Cl. 230—56)

This invention relates to a novel crank-and-rod mechanism for producing a periodic linear motion taking place almost entirely over a small portion of the crank cycle.

In high-speed piston engines, it is desirable to have a valve mechanism which will operate with low friction losses. Also, there is a need for a mechanism which will provide most of its linear displacement in less than 10 degrees of rotation of the cam shaft or lift mechanism shaft. Conventional cams require from 40° to 80° of shaft rotation to give full displacement and 25° or more shaft rotation to give better than 50% of the design displacement.

The present invention solves the problem and provides the needed mechanism. It is reliable and efficient at high crank speeds; it has a very low friction, and it can give most of its linear displacement in less than 10 degrees of rotation of its shaft.

The mechanism of this invention may be used to open and close the separating valve in an integral compressor engine of the type described in Patent 2,928,584 and in my copending patent application Serial No. 89,056, filed February 13, 1961. It may be used to quickly accelerate a separating valve to its open position and to hold the separating valve open during most of the separating process; thus the flow loss of high pressure gas through the separating port can be very small. A system employing this invention will be dynamically balanced, and the linkage will not have as high bearing stress as a cam; thus it can be operated at a much higher rotating speed than a cam. Although its bearing stress is less than the corresponding cam, it may be designed to produce a much larger total lift force for the valve tappet.

Other objects and advantages of the invention will appear from the following description of a preferred embodiment thereof.

In the drawings:

FIG. 1 is a fragmentary view in elevation and in section of a crank-and-rod mechanism embodying the principles of the invention;

FIGS. 2 and 3 are diagrams taken along the line 2—2 in FIG. 1, showing the relative positions of the connecting rod and crankshafts for several positions in a cycle; and FIG. 4 is a generally diagrammatic and partly fragmentary view showing relative positions of the crankshafts for the engine piston and the valve lift mechanism in an integral compressor engine gas generator. The separating valve and piston are shown by broken lines.

FIG. 6 is a fragmentary view in elevation and in section of an integral compressor engine to which the device of FIG. 1 is shown connected, most of the FIG. 1 device being broken off.

Figures 1, 4:
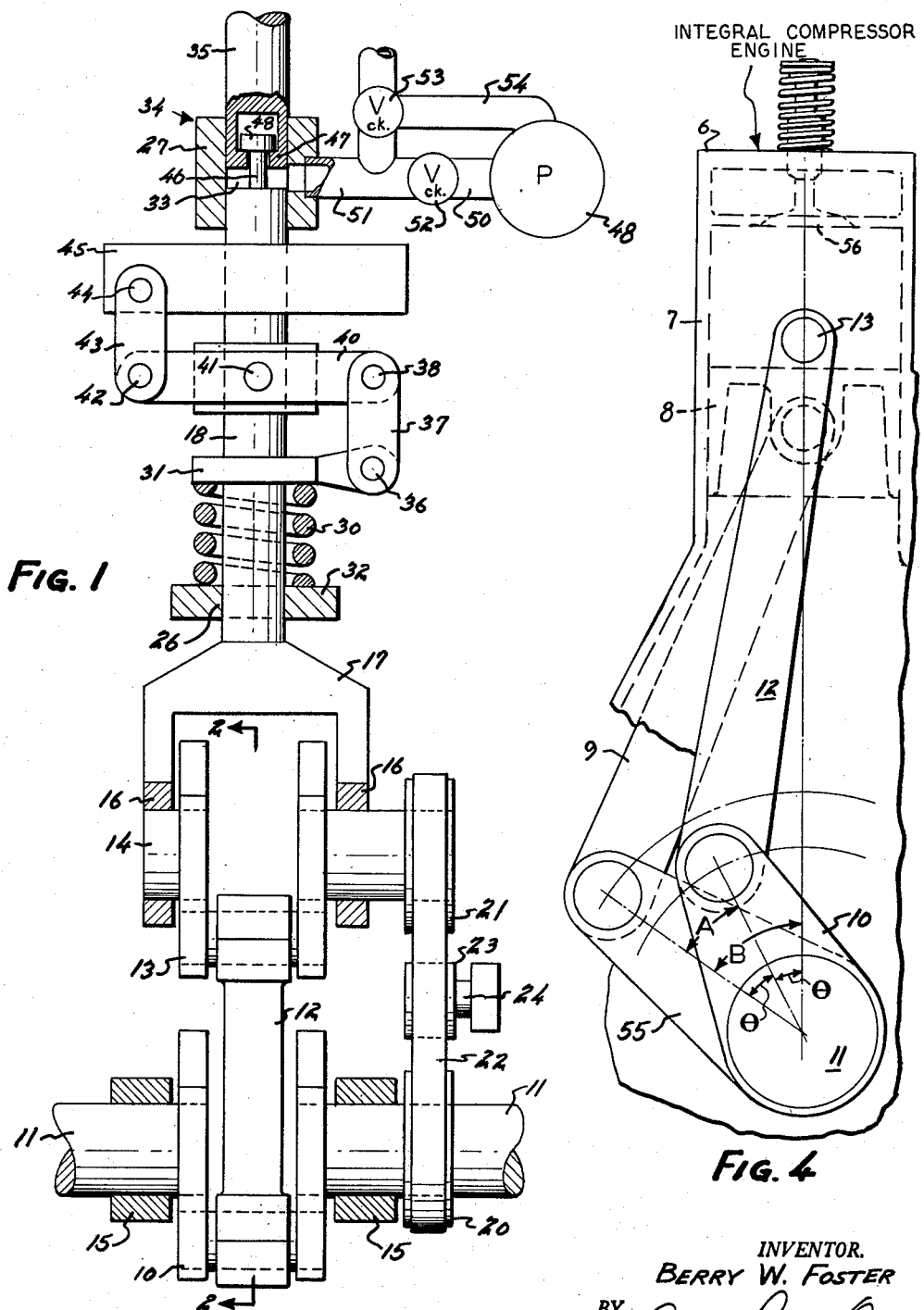

The linear displacement mechanism shown in FIG. 1 includes a crank 10 mounted on a crankshaft 11, which may be powered by a suitable prime mover, which may include an integral compressor engine 6 with a cylinder 7, piston 8, and connecting rod 9 (FIG. 4). One end of a connecting rod 12 is pinned to the crank 10, and the other end of the connecting rod 12 is pinned to another crank 13, which may be mounted on a second shaft 14. Main bearings 15 for the crankshaft 11 may be rigidly secured to the prime mover structure. The crankshaft 14 has its main bearings 16 carried in a forked yoke 17, which is a rigid part of a tappet rod 18 and moves with it.

A pulley wheel 20 is preferably mounted on the crankshaft 11, and a pulley wheel 21 is mounted on the crankshaft 14. An elastic pulley belt 22 joins the pulleys 20 and 21, and a spring-loaded idler 23 mounted on a stub shaft 24 keeps the belt 22 in tension. The belt 22 transmits no power; it only keeps the crankshafts 11 and 14 rotating in the same direction at approximately the same speeds. The elastic belt 22 and the spring-loaded idler 23 make it possible for the phase angle between the crankshafts 11 and 14 to oscillate as they rotate. Both crankshafts always rotate the same number of revolutions; in most cases the crankshaft 11 will be rotating at a constant speed with no acceleration, while the crankshaft 14 will be oscillating as it rotates, so that it will accelerate and decelerate as it rotates.

The radius $R_1$ (see FIGS. 2 and 3) of the crank 10 is preferably larger than the radius $R_2$ of the crank 13. For a maximum linear displacement of D, the relation between the crankshaft radii will be: $R_1 = R_2 + D/2$.

The tappet rod 18 slides in rigidly mounted bearings 26 and 27, which force it to move in a linear direction only, since the bearings 26 and 27 are rigid to forces normal to the line of motion. Thus, the crankshaft 14 is constrained to follow the linear motion of the tappet rod 18. A spring 30, compressed between collar 31 on the tappet 18 and a rigid structure 32 helps to keep the belt 22 in tension and forces the tappet 18 to compress oil in a cylinder 33 of a hydraulic valve lifter 34; thus there is always a compressive force between the tappet rod 18 and a rod 35. The force required to displace the rod 35 is always greater than the compression force of the spring 30, so that only the lift force on the cranks 10 and 13 and the rod 12 will move the rod 35.

In order to keep the lift mechanism in dynamic balance when the tappet rod 18 is being displaced, a counter motion mass system is used. For example, the tappet collar 31 may be pivotally secured by a pin 36 to a link 37, and the other end of this link 37 may be pivotally secured by a pin 38 to a lever 40. The lever 40 may have a fulcrum 41 at its center where it may be pinned to the rigid structure of the prime mover; the other end of the lever 40 may be secured by a pin 42 to a link 43, which may be pinned at its other end 44 to a counter mass 45. The counter mass 45 preferably slides on a lubricated low-friction guide surface of the rod 18. The mass of the counter mass 45 is equal to the combined mass of the tappet rod 18, the rod 35, the fork 17, the crank 13, the shaft 14, the pulley 21, and that portion of the connecting rod 12 which is supported by the crank 13. The linkage is such that the mass 45 moves in the opposite direction and at the same speed as the tappet 18 when it is displaced; thus the system is maintained in dynamic balance.

A hydraulic valve lifter 34 may be used to insure that there will be a tight fit at all of the joints in the valve lifting device. The hydraulic valve lifter 34 includes the cylinder bearing 27 in which the rods 18 and 35 reciprocate. A bolt 46 rigidly secured to the end of the rod 18 slides in a bearing 47 of the rod 35. The head 48 of the bolt 46 acts on the bearing 47 of the rod 35 to limit the gap between the ends of the rods 18 and 35. A hydraulic pump 48 keeps the cylinder cavity 33 under pressure by supplying oil through lines 50 and 51 and a check valve 52. Check valves 52 and 53 keep the oil in the cavity 33 when the tappets 18 and 35 are under high lift loads for the valves, etc. If the rod 35 is not to be moved while the crank 10 is rotating, the valve 53 may be automatically held open, and the valve 52 may be automatically held closed; thus the oil in the cavity 33 will flow through a line 54 to the low pressure sump side of the pump 48. Thus the rod 18 will reciprocate, but the low oil pressure in the cavity 33 will not be sufficient to move the rod 35.

Figures 2, 3:
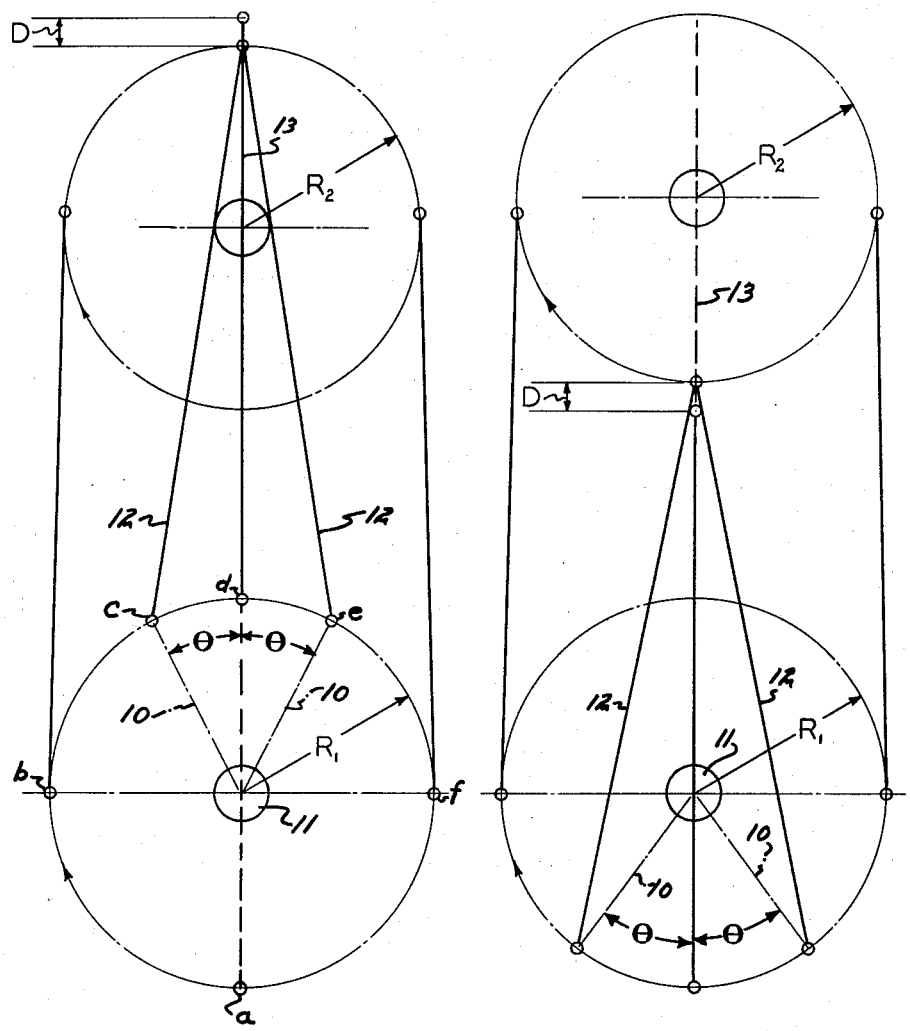
Figure 5:
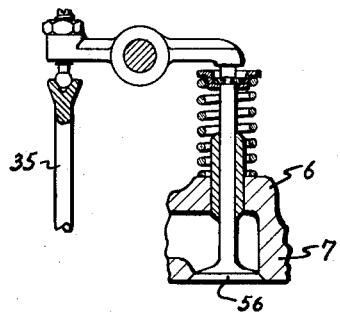
FIG. 5 is a fragmentary view in elevation and section of a typical separating valve and its opening mechanism.

A preferred arrangement of the crankshafts 11 and 14 is illustrated in FIG. 2. The distance between the two crankshafts 11 and 14 is held constant over most of the cycle. Various positions of the crankshafts and connecting rod are indicated by the lower case letters. When the power shaft 11 rotates clockwise from position $a$ to $b$ to $c$, the free running shaft 14 will be forced to accelerate and rotate at a speed faster than the speed of shaft 11. At the $c$ position, the crank 10 acts on the connecting rod 12 and crank 13 and lift crankshaft 14, tappet 18, etc. At the same time, the crankshaft 14 is forced to decelerate until it is rotating at approximately the same speed as the shaft 11 when the mechanism is at the $d$ position. At the $d$ position the tappet 18 has been displaced the amount D. The displacement D is preferably linear and parallel to the line through the center of the crankshafts 11 and 14; however, it may be curvi-linear and at an angle to the line through the center of crankshafts 11 and 14. As the mechanism moves from the $d$ to the $e$ position, the force on the rod 35 and tappet 18 acts on the crank 13, connecting rod 12, and crank 10 to give the stored energy back to the crankshaft 11. For a perfect system with no friction, the power used to displace the mechanism will be given back to the shaft 11 as the mechanism is returned by the stored spring force. As the mechanism moves from the $d$ to $e$ position, the crankshaft 14 is forced to accelerate until it is rotating at a speed greater than the crankshaft 11. As the mechanism moves from the $e$ to $f$ to $a$ position, the crankshaft 14 is forced to decelerate until it is rotating at approximately the same speed as the crankshaft 11 at the position $a$. The belt 22 and pulleys 20 and 21 insure that the crankshafts 11 and 14 rotate in the same direction. The elastic belt 22 and the spring-loaded idler 23 permit the phase angle between the crankshafts 11 and 14 to fluctuate as much as 60 degrees during the complete cycle.

FIG. 3 illustrates the other extreme position of the mechanism. In this arrangement the crank 10 and the connecting rod 12 are forced to pull the crank 13 and crankshaft 14 down. This arrangement requires a larger angular motion of the crankshaft 10 for the same displacement than the FIG. 2 arrangement.

By locating the two crankshafts so they are in a position between FIGS. 2 and 3, the displacement D can be accomplished in two operations, which are phased 180 degrees apart. This double motion and division of motion may be useful in a mechanical calculator or similar system.

For the FIG. 2 arrangement the tappet 18 displacement takes place between the $c$ and $e$ positions. The displacement S in terms of the crank 10 position is:

$$S = D - [R_1 + L - R_1 \cos \theta_v - \sqrt{L^2 - R_1^2 \sin^2 \theta_v}]$$

where
L is the length of the connecting rod 12,
$R_1$ is the radius of crank 10,
D is the maximum displacement, and
$\theta_v$ is the crank angle The preceding equation is only valid when $\theta_v < 0$ shown on FIG. 1.

The linear displacement device of FIG. 1 makes an excellent valve lifter for the separating valves of the integral compressor-engines described in Patent 2,928,584 and in my copending patent application Serial No. 89,056, filed February 13, 1961. The crank 10 of the lift mechanism may lead by a phase angle A (see FIG. 4), a crank 55 that is connected by the rod 9 to the piston 8 of the integral compressor engine whose valve 56 is being timed. Thus the separating valve 56 will start to open at an angle of $\theta + A$ before the integral compressor engine piston 8 reaches the head dead center. If the angles A and $\theta$ are equal, the separating valve 56 will be closed when the piston 8 is at head dead center. If $A < \theta$, the separating valve 56 will be closed after the piston 8 reaches head dead center, and when the crank 55 is at an angle of $(\theta - A)$ past the head dead center position. If $A > \theta$, the separating valve 56 will be closed before the piston reaches head dead center, and when the crank 55 is at an angle of $(A - \theta)$ just before the head dead center position. The cranks 10 and 55 may be driven by the same crankshaft 11 at the same speed. As illustrated by FIG. 4, they may be mounted on the same coaxial shaft. Naturally other arrangements may be used. For four-cycle engines the crank 55 may be designed to rotate at twice the speed as the crank 10.

The integral compressor engine 6 is similar to the gas generator described in Patent 2,928,584 and in my application Serial No. 89,056, having the engine cylinder 7 in which piston 8 reciprocates. The piston 8 is connected to the crankshaft 11 by the connecting rod 9 and the crank 55. The cylinder 7 has a head end 57 with the separating valve 56 which opens and closes a port 58 leading to a chamber 59. From the chamber 59 a conduit 60 leads the high pressure gas into an accumulator 61 or other means for storing compressed gas. A spring 62 or an equivalent pneumatic spring if desired, acts on the end of a stem 63 for the valve 56 and urges the valve 56 to its closed position. When the rod 35 has forced the valve 56 closed, a fuel injector 65 sends a charge of fuel through a nozzle of a port 66 into a precombustion chamber 67 where the gases are ignited and exploded and whence they are forced through a port 68 into the cylinder 7, where there is further combustion and heating of the gases in the cylinder 7, and they expand to do work on the piston 8 and force it to move. As the piston 8 approaches the crank end position, the piston 8 uncovers an engine intake sleeve port 70 and an engine exhaust sleeve port 71. A supercharger 70a then sends fresh air to the intake port 70 through conduits 69 and 72, and the exhaust gases are scavenged out through the exhaust port 71 through a conduit 73. Immediately after closure of the valve 56, a cam 74, which is also driven by the crankshaft 11, engages a tappet 75 that actuates the fuel injector 65. A cam 76 driven by the crankshaft 11 may be timed so that it will act on a tappet 77 during the compression stroke of the piston 8 and cause a water injector 78 to spray a prescribed amount of water through a port 79 into the engine cylinder 7 during the compression stroke; thus the compression process can be made to approach a constant temperature process.

When the integral compressor engine is generating high pressure gas for a high pressure piston motor, the separating valve 56 should be designed so that it will start to open at close to 40 degrees before head dead center position of the piston 8. The separating valve 56 should be accelerated open rapidly and remain open during most of the separating process, then close rapidly near the head dead center position of the piston. For an illustrative example, let $\theta = A = 20$ degrees. Thus, the separating valve 56 will start to open at $2\theta = 40$ degrees before head dead center position of the piston 8. Following is a table giving the approximate positions of the separating valve 56 and piston 8 for several piston crank 55 angular positions B from head dead center position:

| B Degrees | Percent Open Position of Separating Valve | Relative Engine Displacement during Separation | Percent of Gas Separated | Piston Speed for N=3,000 r.p.m. r 4''; 1/r=4 ft./sec. | Gas Vel. through Separating Port, Port Area Piston Area=½ ft./sec. | Percent Sonic Velocity for Gas in Separating Port for T=850° R |
|---|---|---|---|---|---|---|
| 40 | 0 | 1.00 | 0 | 81 | 0 | 0 |
| 38 | 26 | .94 | 10 | 79 | 1,210 | 84 |
| 35 | 47 | .86 | 22 | 73 | 620 | 43 |
| 30 | 73 | .72 | 44 | 64 | 350 | 24 |
| 20 | 100 | .53 | 75 | 44 | 176 | 12 |
| 10 | 73 | .41 | 94 | 23 | 126 | 9 |
| 0 | 0 | .37 | 100 | 0 | 0 | 0 |

The values in the above table are for the maximum output of a gas generator; the maximum piston speed for the conditions in the above table will be 108 ft./sec. This is about the maximum practical speed limit for the sliding friction between the piston and cylinder. Under most operating conditions the piston speed will be less than 80% of this value. Also the ratio of port area to piston area of 1/4 is considered as the minimum practical port area. Even under the maximum flow conditions as given in the preceding table, the flow through the separating port opened by the valve 56 will be less than sonic for over 90% of the gas flow through the separating port; for 75% of the gas flow through the separating port the gas velocity will be less than 40% of sonic velocity. For over 56% of the gas flow through the separating port the gas velocity will be less than 24% sonic. For these subsonic gas flows through the separating port, the separating process can be made very efficient. When the gas generator is operated at design speed conditions, the velocity of the gases through the separating port will be a fraction of sonic for most of the flow through the separating port. For these low subsnic gas speeds the nozzle efficiency of the separating port may be as high as 98%.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A device for producing a periodic linear displacement over a small portion of its cycle comprising:
   a first crankshaft having fixed main bearings, first crank and mounted on said fixed main bearings;
   a power shaft for driving and timing said first crankshaft;
   a second crankshaft having a second crank,
   a common connecting rod connecting said first and second cranks and driving said second crank,
   second main bearings, said second crankshaft being mounted on said second main bearings;
   a reciprocating rod on which said second main bearings are mounted; and
   means for constraining said reciprocating rod to move only in a linear direction approximately parallel to the line between the centers of the two said crankshafts.
2. The device of claim 1 wherein the radius of said first crank is greater than that of said second crank.
3. Means for providing dynamic balance for the device of claim 1 comprising:
   a countermass;
   means for connecting said countermass to said reciprocating rod for movement in the opposite direction, so that the dynamic loads of said countermass balance the dynamic loads of the device.
4. The device of claim 1 wherein means is provided for causing said two crankshafts to rotate in the same direction while enabling said second crankshaft to oscillate as it rotates.
5. The device of claim 4 wherein the means for causing the two said crankshafts to rotate in the same direction comprises two pulleys of the same diameter, one mounted on said first crankshaft and the other on said second crankshaft;
   a flexible belt connecting the two said pulleys; and
   means for keeping said belt in tension.
6. The device in claim 1 having means for determining the relative positions of the said two crankshafts so that said common connecting rod will produce only one linear displacement per cycle on said reciprocating rod, said displacement taking place at the crank angles close to where said first crank is closest to said second crankshaft.
7. The device in claim 1 having means for maintaining the relative positions of the said two crankshafts so that said common connecting rod produces only on linear displacement on said reciprocating rod, said displacement taking place at the crank angles close to where said first crank is furthest from said second crankshaft.
8. The device in claim 1 having means for maintaining the relative positions of said crankshafts so that said common connecting rod will produce two linear displacements per cycle on said reciprocating rod, one displacement taking place at the crank angles close to where said first crank is closest to said free crankshaft, the other displacement taking place at the crank angles close to where said first crank is furthest from said crankshaft, said two displacements being phased 180 degrees apart.
9. The device in claim 1 having a hydraulic lift device with means for providing tight fits at all the joints thereof, and a mechanical stop device to prevent said reciprocating rod from being displaced too close toward said first crankshaft, thereby preventing the common connecting rod from producing two displacements per cycle.
10. The device of claim 9 having valve means to reduce the hydraulic pressure of said lift device so said tappet may move and only displace the oil.
11. A mechanism for opening and closing the separating valve in an integral compressor engine having a housing, a rotating drive shaft, at least one connecting rod, at least one piston, at least one separating valve, a first crankshaft, and main bearings for said first crankshaft being secured rigidly to said housing, comprising,
   first and second cranks on said first crankshaft driven by said shaft at the same speed, said first crank being driven by said connecting rod and piston,
   said second crank being phased to lead said first crank to open said separating valve as said piston approaches its head position, said second crank closing said separating valve when said piston is near its head dead center position,
   a second free crankshaft,
   a third crank mounted on said free crankshaft,
   a common connecting rod connecting said second and third cranks and driving said third crank,
   a tappet for said separating valve carrying main bearings in which said second free crankshaft is mounted for movement therewith;
   means for constraining said tappet to move only in a linear direction parallel to the line between the centers of the said first and second crankshafts;
   means for holding said tappet against said separating valve mechanism, and means positioning said first and second crankshafts so that said common connecting rod will produce displacement of said tappet and separating valve system only at the crank positions where said second crank is closest to said free crankshaft.
12. The device of claim 11 having flexible belt and pulley means for insuring that said second and third cranks rotate in the same direction, said free crankshaft being free to oscillate as it rotates.

13. A mechanism for opening and closing the separating valve in an integral compressor engine having a housing, a rotating drive shaft, at least one connecting rod, at least one piston, at least one separating valve, and a first crankshaft, the main bearings for said first crankshaft being secured rigidly to said housing, comprising > first crank means on said first crankshaft connected to each said connecting rod and piston, so that said first said crankshaft is driven by said connecting rod and piston,
> a second free crankshaft having a second crank,
> a common connecting rod connecting said first and second cranks for driving said second crank,
> a tappet for said separating valve carrying main bearings in which said free crankshaft is mounted for movement therewith,
> means for constraining said tappet to move only in a linear direction parallel to the line between the centers of the said first and second crankshafts,
> means for holding said tappet against said separating valve, and
> means for positioning said first and second crankshafts so that said common connecting rod produces displacement of said tappet and said separating valve only at the crank positions where said second crank is closest to said free crankshaft.

14. The device of claim 13 wherein said tappet is positioned so that it opens said separating valve when said piston is on the latter part of the stroke toward its head and closes said separating valve when said piston is at or near its head dead center position.

References Cited in the file of this patent

UNITED STATES PATENTS

| | | |
|---|---|---|
| 398,903 | Reynolds et al. | Mar. 5, 1889 |
| 2,093,495 | Thompson | Sept. 21, 1937 |
| 2,928,584 | Foster | Mar. 15, 1960 |
| 2,999,491 | Harkness | Sept. 12, 1961 |

UNITED STATES PATENT OFFICE
CERTIFICATE OF CORRECTION

Patent No. 3,155,309                       November 3, 1964

Berry W. Foster

It is hereby certified that error appears in the above numbered patent requiring correction and that the said Letters Patent should read as corrected below.

Column 5, line 50, for "a first crankshaft having fixed main bearings," read -- fixed main bearings, a first crankshaft having a --.

Signed and sealed this 1st day of June 1965.

(SEAL)
Attest:

ERNEST W. SWIDER                           EDWARD J. BRENNER
Attesting Officer                               Commissioner of Patents